United States Patent Office 3,384,435
Patented May 21, 1968

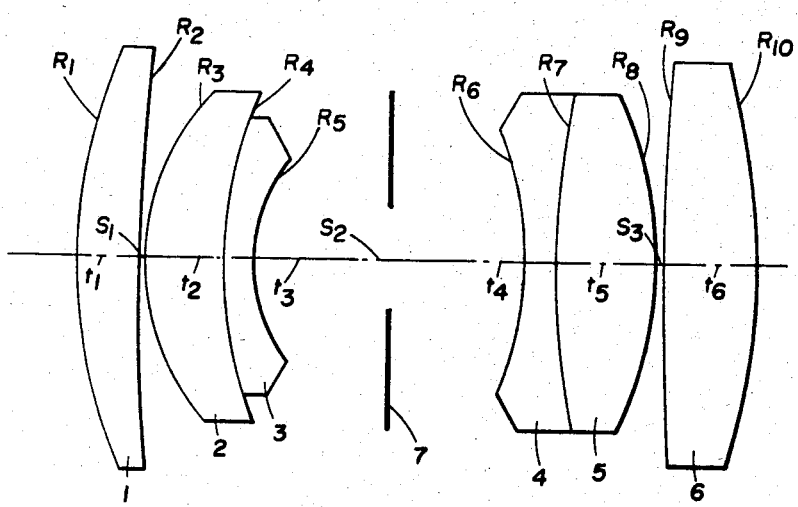

3,384,435
FOUR COMPONENT PHOTOGRAPHIC OBJECTIVE OF THE GAUSS TYPE
Willy E. Schade and Myrtle C. Schild, Rochester, N.Y., assignors to Eastman Kodak Company, Rochester, N.Y., a corporation of New Jersey
Filed Nov. 25, 1964, Ser. No. 413,935
2 Claims. (Cl. 350—209)

ABSTRACT OF THE DISCLOSURE

A photographic objective is disclosed comprising a diaphragm, two negative meniscus doublets placed on either side of and concave to the diaphragm, and a single positive element placed on the side away from the diaphragm of each negative meniscus doublet.

---

This invention relates to photographic objectives of the six-element double Gauss type. More particularly, it relates to photographic objectives of such type having sufficiently high corrections to serve in document copying work at high magnifications.

Objectives of the six-element double Gauss type contain two meniscus negative doublets concave to and on either side of a diaphragm. The negative doublets are enclosed by two single positive elements.

Design of an objective for document copying work requires extremely high corrections. In adapting a double Gauss type objective to this type of work corrections for oblique spherical aberration and sphero-chromatism are quite difficult to reduce to an absolute minimum while keeping the other aberrations under control.

It is the object of this invention to provide objectives of the double Gauss type which are sufficiently well corrected for sphero-chromatism and oblique spherical aberration as well as all other aberrations to serve in document copying work. We found that this high degree of correction is obtainable by the use of certain relationships set out in more detail below.

In the accompanying drawing, FIG. 1 is a diagrammatic axial cross-section of a preferred embodiment of the invention.

FIG. 2 gives the specification for that embodiment.

The terms "front" and "rear" as used herein shall mean the long conjugate side of the objective and the short conjugate side of the objective, respectively.

In the figure and the examples below, the elements are numbered from front to rear from 1 to 6, the radii from $R_1$ to $R_{10}$, the thicknesses from $t_1$ to $t_6$ and the separations from $S_1$ to $S_3$. The indexes $N_d$ are given for the D line of the spectrum and V represents the dispersive indexes.

The high corrections obtained according to this invention are partially made possible by the use of high index glasses. Specifically, in the six elements of this objective at least three use glasses with indexes of at least 1.70 and all indexes are in excess of 1.65.

With the use of high index glasses, sphero-chromatism and oblique spherical aberration can best be corrected when this lens is to be used at high magnification by bending the negative doublet on the long conjugate side into a considerably more meniscus shape than the negative doublet on the short conjugate side and by keeping the distance between these two doublets quite large. More specifically, the above-mentioned parameters should be within the following ranges:

$$N_1, N_5, N_6 > 1.70$$
$$N_2, N_3, N_4 > 1.65$$
$$S_2 > .25F$$

$$-\frac{R_6}{R_5} > 2$$

$$-\frac{R_8}{R_3} > 1.5$$

$$R_4 < .75F$$

The above relationships can be best accomplished with a well-corrected lens if the various parameters of the objective are kept within the following ranges:

| | |
|---|---|
| $.6 < +R_1 < .7F$ | $.001F < S_1 < .01F$ |
| $1.0F < +R_2 < \infty$ | $.25F < S_2 < .4F$ |
| $.25F < +R_3 < .35F$ | $.001F < S_3 < .01F$ |
| $.4F < +R_4 < .6F$ | $1.70 < N_1 < 1.80$ |
| $.17F < +R_5 < .23F$ | $1.65 < N_2 < 1.75$ |
| $.35F < -R_6 < .6F$ | $1.65 < N_3 < 1.72$ |
| $.7F < +R_7 < \infty$ | $1.65 < N_4 < 1.70$ |
| $.45F < -R_8 < .6F$ | $1.70 < N_5 < 1.80$ |
| $2.0F < +R_9 < \infty$ | $1.70 < N_6 < 1.80$ |
| $.6F < -R_{10} < 1.5F$ | $42 < V_1 < 60$ |
| $.05F < t_1 < .1F$ | $42 < V_2 < 60$ |
| $.07F < t_2 < .12F$ | $29 < V_3 < 34$ |
| $.02F < t_3 < .05F$ | $29 < V_4 < 34$ |
| $.02F < t_4 < .05F$ | $42 < V_5 < 60$ |
| $.10F < t_5 < .15F$ | $42 < V_6 < 60$ |
| $.10F < t_6 < .15F$ | |

Objectives according to the invention can be constructed according to the specifications of the following examples:

EXAMPLE 1

$F = 100$ mm.    $f/5.6$

| Lens Element | $N_d$ | V | Radii, mm. | Thickness, mm. |
|---|---|---|---|---|
| 1 | 1.744 | 45.6 | $R_1 = +62.5$ | $t_1 = 7.9$ |
| | | | $R_2 = +164$ | $S_1 = .40$ |
| 2 | 1.697 | 56.2 | $R_3 = +28.7$ | $t_2 = 9.4$ |
| 3 | 1.689 | 30.9 | $R_4 = +51.2$ | $t_3 = 3.5$ |
| | | | $R_5 = +19.3$ | $S_2 = 32.4$ |
| | | | $R_6 = -41.5$ | |
| 4 | 1.672 | 32.3 | $R_7 = +99.5$ | $t_4 = 3.5$ |
| 5 | 1.744 | 43.9 | $R_8 = -47.6$ | $t_5 = 12$ |
| | | | $R_9 = +807$ | $S_3 = .40$ |
| 6 | 1.734 | 51.0 | $R_{10} = -103$ | $t_6 = 11$ |

EXAMPLE 2

$F = 100$ mm.    $f/5.6$

| Lens Element | $N_d$ | V | Radii, mm. | Thickness, mm. |
|---|---|---|---|---|
| 1 | 1.744 | 45.8 | $R_1 = +69.3$ | $t_1 = 8.8$ |
| | | | $R_2 = +182$ | $S_1 = .47$ |
| 2 | 1.697 | 56.2 | $R_3 = +31.8$ | $t_2 = 10.4$ |
| 3 | 1.689 | 30.9 | $R_4 = +56.8$ | $t_3 = 3.9$ |
| | | | $R_5 = +21.4$ | $S_2 = 37.6$ |
| | | | $R_6 = -46.2$ | |
| 4 | 1.672 | 32.3 | $R_7 = +110$ | $t_4 = 3.9$ |
| 5 | 1.734 | 51.0 | $R_8 = -52.3$ | $t_5 = 13.6$ |
| | | | $R_9 = +897$ | $S_3 = .47$ |
| 6 | 1.734 | 51.0 | $R_{10} = -84.0$ | $t_6 = 13.5$ |

In these two examples extremely fine corrections over a wide field are obtained with magnifications between 20 to 1 and 40 to 1. However, the invention may be incorporated into objectives to be used at other magnifications.

The invention has been described in considerable detail with particular reference to certain preferred embodiments thereof, but it will be understood that variations and modifications can be effected within the spirit and scope of the invention as described hereinabove and as defined in the appended claims.

We claim:

1. A photographic objective having a focal length of 100 mm. comprising a diaphragm, two negative meniscus doublets placed on either side of and concave to the diaphragm, and a single positive element placed on the side away from the diaphragm of each negative meniscus doublet, the lens elements having substantially the following characteristics and spatial relations in which the lens elements are numbered from front to rear, $N_d$ is the index of refraction, V is the index of dispersion, and R, $t$ and S refer respectively to the radii of curvature of the lens surfaces, the axial thicknesses of the lens elements and the axial spacings between the lens elements, numbered by subscript from front to rear:

$F = 100$ mm. $\quad f/5.6$

| Lens Element | $N_d$ | V | Radii, mm. | Thickness, mm. |
|---|---|---|---|---|
| 1 | 1.744 | 45.6 | $R_1 = +62.5$ | $t_1 = 7.9$ |
|   |       |      | $R_2 = +164$  | $S_1 = .40$ |
| 2 | 1.697 | 56.2 | $R_3 = +28.7$ | $t_2 = 9.4$ |
|   |       |      | $R_4 = +51.2$ |  |
| 3 | 1.689 | 30.9 | $R_5 = +19.3$ | $t_3 = 3.5$ |
|   |       |      |               | $S_2 = 32.4$ |
| 4 | 1.672 | 32.3 | $R_6 = -41.5$ | $t_4 = 3.5$ |
|   |       |      | $R_7 = +99.5$ |  |
| 5 | 1.744 | 43.9 | $R_8 = -47.6$ | $t_5 = 12$ |
|   |       |      |               | $S_3 = .40$ |
| 6 | 1.734 | 51.0 | $R_9 = +807$  | $t_6 = 11$ |
|   |       |      | $R_{10} = -103$ |  |

2. A photographic objective having a focal length of 100 mm. comprising a diaphragm, two negative meniscus doublets placed on either side of and concave to the diaphragm, and a single positive element placed on the side away from the diaphragm of each negative meniscus doublet, the lens elements having substantially the following characteristics and spatial relations in which the lens elements are numbered from front to rear, $N_d$ is the index of refraction, V is the index of dispersion, and R, $t$ and S refer respectively to the radii of curvature of the lens surfaces, the axial thicknesses of the lens elements and the axial spacings between the lens elements, numbered by subscript from front to rear:

$F = 100$ mm. $\quad f/5.6$

| Lens Element | $N_d$ | V | Radii, mm. | Thickness, mm. |
|---|---|---|---|---|
| 1 | 1.744 | 45.8 | $R_1 = +69.3$ | $t_1 = 8.8$ |
|   |       |      | $R_2 = +182$  | $S_1 = .47$ |
| 2 | 1.697 | 56.2 | $R_3 = +31.8$ | $t_2 = 10.4$ |
|   |       |      | $R_4 = +56.8$ |  |
| 3 | 1.689 | 30.9 | $R_5 = +21.4$ | $t_3 = 3.9$ |
|   |       |      |               | $S_2 = 37.6$ |
| 4 | 1.672 | 32.3 | $R_6 = -46.2$ | $t_4 = 3.9$ |
|   |       |      | $R_7 = +110$  |  |
| 5 | 1.734 | 51.0 | $R_8 = -52.3$ | $t_5 = 13.6$ |
|   |       |      |               | $S_3 = .47$ |
| 6 | 1.734 | 51.0 | $R_9 = +897$  | $t_6 = 13.5$ |
|   |       |      | $R_{10} = -84.0$ |  |

References Cited
UNITED STATES PATENTS 2,681,594   6/1954   Ito _____ 350—222
2,936,675   5/1960   Schade _____ 350—222

DAVID H. RUBIN, *Primary Examiner.*
JOHN K. CORBIN, *Examiner.*